Aug. 14, 1945. J. R. BURKE ET AL 2,382,201
TIMBER LOAD CARRYING MEMBER
Filed May 1, 1943
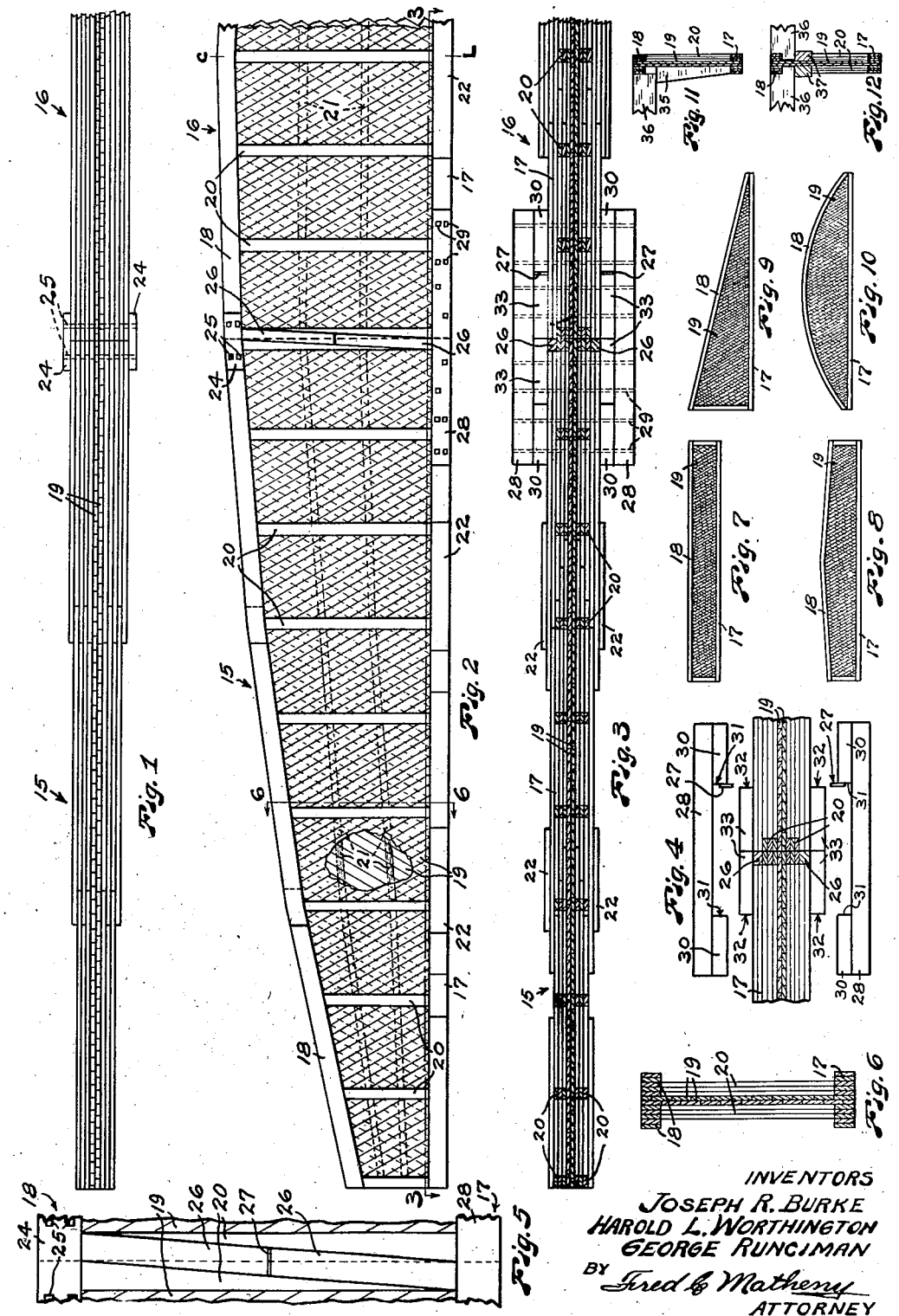
INVENTORS
JOSEPH R. BURKE
HAROLD L. WORTHINGTON
GEORGE RUNCIMAN
BY Fred C. Matheny
ATTORNEY Patented Aug. 14, 1945

2,382,201

UNITED STATES PATENT OFFICE 2,382,201

TIMBER LOAD CARRYING MEMBER

Joseph R. Burke, Harold L. Worthington, and George Runciman, Seattle, Wash.

Application May 1, 1943, Serial No. 485,326

6 Claims. (Cl. 20—0.5)

This invention relates to crossweb timber load carrying members, such as trusses, girders, beams, joists and the like, and a general object of this invention is to provide a crossweb timber load carrying member that is very strong and durable, that is not expensive to construct and that uses a minimum amount of metal in its construction.

Another object is to provide a sectional crossweb timber load carrying member that is made up of sections which can be constructed in a manufacturing plant and which can be readily shipped on railway cars of standard construction and which can be readily connected together in erecting them at the location where they are used.

Another object is to provide a crossweb timber load carrying member of great strength that is made up of short boards or pieces of timber of standard size secured together by an adhesive, such as glue.

Another object is to provide a crossweb timber load carrying member having novel and efficient shear transferring means adapted to transfer shear loads from one section of said member to another when the sections of said member are in properly assembled relation.

Another object is to provide novel lower chord splice means for splicing together the lower chord members of adjoining sections of a sectional load carrying member, said lower chord splice means being simple in construction, easily applied and having great tensile strength.

Other objects of the invention will be apparent from the following description taken in connection with the accompanying drawing.

In instances herein where the term "truss" is used it is to be understood that this term applies to any load carrying member of this type whether the said member is used as a truss, a beam, a girder, a joist or in some other capacity.

In the drawing, Figure 1 is a fragmentary plan view showing the top chord of a truss type load carrying member constructed in accordance with this invention.

Fig. 2 is a fragmentary elevation of said load carrying member.

Fig. 3 is a sectional view, with parts in plan, taken substantially on broken line 3—3 of Fig. 2.

Fig. 4 is a fragmentary exploded view partly in plan and partly in section taken substantially on the broken line 3—3 of Fig. 2 and showing the lower chord splice.

Fig. 5 is a fragmentary elevation, on a larger scale than the other figures, showing shear transferring members used to transfer shear across a joint between two adjacent sections of the load carrying member.

Fig. 6 is a vertical sectional view of the load carrying member with parts in elevation taken substantially on broken line 6—6 of Fig. 2.

Figs. 7, 8, 9 and 10 are somewhat diagrammatic elevations, on a smaller scale than the other figures, illustrating four other types of crossweb load carrying members constructed in accordance with this invention.

Figs. 11 and 12 are small scale sectional views showing two ways of attaching ledger members to the cross webbing of load carrying members of this type to form supports for the end portions of transverse members, such as joists.

Like reference numerals designate like parts throughout the several views of the drawing.

In the drawing Figs. 1 to 6 show one end section 15 and a little more than one half of a center section 16 of a three-section crossweb truss constructed in accordance with this invention, said truss being symmetrical as respects the portions at the two sides of the center line C—L of Fig. 2.

Each section of the load carrying member shown in Figs. 1 to 6 is made up of a lower chord member 17 and upper chord member 18 having cross webbing 19 and upright stiffener members 20 therebetween.

The cross webbing 19 between the upper and lower chords preferably is formed of two plys of diagonally positioned boards such as ordinary 1" x 6", or pieces of plywood or boards having interfitting tongues and grooves on their edge portions. These boards 19 are disposed in the medial plane of the truss and extend diagonally between the top and bottom chords 18 and 17. The diagonally positioned boards 19 which form the two plies of crosswebbing are in face to face contact and are crossed relative to each other and are rigidly glued together. The drawing shows the boards of each ply placed in edge to edge contact, and if desired, the edges of these boards may be glued together. Also it will be understood that the boards in each ply may be spaced apart if desired to leave spaces between the edges thereof. When these boards 19 are placed in edge to edge contact they form a solid wall and provide an efficient fire stop which complies with substantially all fire requirements and ordinances dealing with load carrying members of this type. It will further be understood that more than two plies of cross webbing may be used in each truss if desired.

The boards in the two plies of cross webbing 19 are rigidly glued or adhesively secured together in face to face contact preferably by strips of glue that extend longitudinally of the truss sections, such as the glue strips shown by dotted lines 21 in Fig. 2. Obviously glue may be used throughout the entire contacting area of these boards in the cross webbing 19 or the areas to which glue is applied may be varied in any suitable manner.

The glue strips 21, shown in Fig. 2 are spaced apart and are spaced from the chords. The cross webbing boards 19 are preferably glued together and glued to the chords 17 and 18 as respects the portions of said cross webbing that is embedded in the chords.

The chords 17 and 18 are each built up of a plurality of boards or pieces of timber, such as 1" x 12", placed on opposite sides of the cross-webbing in face to face contact with said cross-webbing and with each other and glued to the webbing and to each other. Preferably a lesser number of boards are used in each chord member near the outer end of the truss and a greater number toward the center of the truss. The end portions of the boards that go to make up each truss section are overlapped and arranged so as to break joints, as shown in the drawings. Splice pads 22 may be provided on the sides of the chords where this overlapping of the ends of the boards occurs. Such splice pads 22 are preferably secured to the lower chord 17 by gluing.

Preferably the upright stiffener members 20 are formed of overlapped pieces of lumber positioned on both sides of the cross webbing 19 and glued to the cross webbing and to each other and extending between the upper and lower chords.

The end portions of adjoining truss sections abut against each other in the assembled truss and means are provided for connecting together the upper chords and the lower chords of said adjoining truss sections and for transferring the shear from one truss section to another, such as from the middle truss section 16, shown in Fig. 2, to the end truss section 15.

The means for connecting together the upper chords of adjoining truss sections comprises two splice pads 24 positioned on opposite sides of said upper chords and secured to the same by bolts 25. As the upper chords operate under compression these splice pads 24 will not be subjected to a great deal of strain.

The shear transferring means comprises two shear transferring members 26 adhesively secured to the stiffening members 20 at the adjoining ends of each of two truss sections. Preferably each shear transferring member 26 is of a length equal to about one half of the depth or distance across the truss at the location where the shear transferring member is applied. Each shear transferring member is positioned at a slight inclined relative to the vertical and has one end abutted against a chord of the truss section and the other end portion overhanging or protruding beyond the plane of the end of the truss section a distance equal to about one half the width of the shear transferring member. One set of shear transferring members at each truss joint extends upwardly and the other set extends downwardly and the adjacent ends of both sets of shear transferring members are properly shaped to rest one upon the other in such a manner that the load on the truss section with which the downwardly extending shear transferring members are connected is transferred to the other truss section. If necessary one or more metal shims 27 may be used between abutting ends of shear transferring members 26, as shown in Fig. 5.

The means for connecting together the lower chords of adjoining truss sections is necessarily tension means. This means, see Figs. 2, 3 and 4, comprises two tension members 28 adapted to be positioned on opposite sides of the lower chord members 17 and secured thereto by bolts 29. Each tension member 28 has two pads 30 adhesively secured to the inner side thereof in spaced apart relation. The inner ends 31 of the pads 30 form shoulders that are adapted to engage with other shoulders 32 provided by the ends of other pads 33 that are adhesively secured, as by glue, to the sides of the lower chord members 17 adjacent the abutting end portions of the two truss sections. Shims 27 may be used between abutting shoulders 31 and 32 if needed.

The joints provided by gluing the pads 30 and 32 to their respective members 28 and 17 have great strength and are capable of withstanding a shear at least as great as the tension load that each of the tension members 28 will carry. We thus provide a very simple and strong tension joint in which all of the parts may be made at a central manufacturing plant and quickly and easily assembled at the location where the truss is used.

The truss shown in Figs. 1 to 6 inclusive is constructed in sections which are capable of being transported on standard railroad cars now in common use, this truss being a three section truss with a span of about one hundred thirty feet. The devices herein disclosed for connecting the truss sections together when the truss is set up make it possible to very easily and quickly connect these truss sections in such a manner as to safely carry maximum truss loads at the joints between the sections. These connecting devices avoid the use of metal timber-connector rings and reduce to a minimum the requirement for bolts. This avoids, to as great an extent as possible, weakening the timbers in the truss by cutting away portions of the same.

The use of glue for securing the numerous pieces of timber together obviates the use of nails and bolts and makes it possible to build up a truss of great strength from small pieces of timber, such as boards of standard dimensions.

Figs. 7, 8, 9, and 10 of the drawing show, somewhat diagrammatically, four other types of crossweb timber load carrying members constructed in accordance with this invention. Obviously any one of these structures may be used as a complete truss or several of these structures may be connected together to form a sectional truss. Vertical stiffeners may be provided intermediate the ends of the truss sections shown in Figs. 7, 8, 9 and 10 if desired.

Fig. 11 shows a ledger member 35 positioned transversely of a timber load carrying member with its lower end resting on the lower chord 17 of the load carrying member and its upper end forming a support for a joist 36 that may be positioned substantially perpendicularly to the load carrying member. The ledger member 35 is securely glued to the cross webbing 19 of the truss and forms a rigid support for the joist 36.

Fig. 12 shows a ledger member 37 provided on each side of a load carrying member and extending longitudinally thereof and securely glued to the load carrying member to form supporting means for the end portions of joists 36 that are positioned substantially perpendicularly to the load carrying member.

Load carrying members formed in accordance with this invention have great strength, are not expensive to manufacture, are highly resistant to moisture when waterproof glue is used in their construction and are easy to transport on standard railroad equipment and to erect.

The foregoing description and accompanying drawing clearly disclose certain preferred embodiments of this invention but it will be understood that this disclosure is merely illustrative and that such changes in the invention may be made as are fairly within the scope and spirit of the following claims.

We claim:

1. A sectional timber load carrying member comprising a plurality of sections each having an upper chord of laminated adhesively connected wooden pieces; a lower chord of laminated adhesively connected wooden pieces; a plurality of layers of wooden strips embedded in and adhesively connected to said chords substantially in the medial plane of the chords and extending between said chords with the strips of each layer in edge to edge engagement and diagonally positioned and the strips of adjacent layers crossed relative to each other and in face to face contact; adhesive means securing said strips of adjacent layers together; upright wooden stiffener strips provided at intervals between said chords and on the outer sides of said diagonal strips, said stiffener strips being adhesively secured together and adhesively secured to the diagonal strips; two upwardly directed shear transferring members adhesively secured to opposite sides of the web member of one of said truss sections and having end portions that overhang the end portions of said truss section; and two downwardly directed shear transferring members adhesively secured to opposite sides of the web member of an adjoining truss section and having end portions that overhang the end portions of said adjoining truss section, the ends of the upwardly and downwardly extending shear transferring members being positioned in abutting relation to trasfer the shear from one truss section to the other when the two truss sections are in properly assembled relation.

2. In a sectional wooden truss, two truss sections positioned in end to end abutting relation; and oppositely extending shear transferring members adhesively secured to the sides of the respective truss sections adjacent the ends thereof and extending substantially at right angles to the length of said truss sections and having end to end contact when the truss sections are in assembled relation whereby shear will be transferred through said shear transferring members from one truss section to the other.

3. In a sectional wooden truss, two truss sections adapted to be positioned in end to end abutting relation, each section comprising an upper chord and a lower chord connected with each other by a web portion; an upwardly directed shear transferring member adhesively secured to the web portion of one of said truss sections and overhanging the end thereof; a downwardly directed shear transferring member adhesively secured to the web portion of the other truss section and overhanging the end thereof, said two shear transferring members being positioned so that the overhanging ends thereof will be in abutting relation with the upper end of the upper shear transmitting member abutting against the upper chord of one truss section and the lower end of the lower shear transmitting member abutting against the lower chord of the other truss section, whereby said shear transmitting members will be in compression and shear loads will be transmitted through said two shear transferring members when said two truss sections are in assembled relation.

4. In a sectional wooden load carrying member, two truss sections adapted to be positioned in end to end abutting relation, each section comprising an upper chord and a lower chord connected with each other by a web portion; two upwardly directed shear transferring members adhesively secured to opposite sides of the web member of one of said truss sections and having end portions that overhang the end portion of the truss section; two downwardly directed shear transferring members adhesively secured to opposite sides of the web member of the other truss section and having end portions that overhang the end portion of the truss section; all of said shear transferring members being parallel to the plane of said truss and extending substantially at right angles to the length of said truss, the ends of the upwardly and downwardly extending shear transferring members being positioned in abutting relation to transfer the shear from one truss section to the other when said two truss sections are in properly assembled relation.

5. The apparatus as claimed in claim 4 in which upright stiffener members are adhesively secured to the opposite sides of each web member adjacent the end thereof and in which the shear transferring members are adhesively secured in inclined positions to the upright stiffener members.

6. In a timber load carrying member, two lower tension chords adapted to be positioned in end to end abutting relation; pad members adhesively secured to the sides of said tension chords adjacent the abutting ends of said tension chords, the outer end portions of said pad members providing shoulders; and splice members adapted to be positioned alongside of said tension chord members in overlapped relation to said pad members, said splice members having spaced apart pads adhesively secured to the inner sides thereof in spaced apart relation and positioned to abut against the outer end portions of the pads on said tension chords.

JOSEPH R. BURKE.
HAROLD L. WORTHINGTON.
GEORGE RUNCIMAN.